(12) United States Patent
Araya et al.

(10) Patent No.: US 9,459,862 B2
(45) Date of Patent: Oct. 4, 2016

(54) AUTOMATED PORTING OF APPLICATION TO MOBILE INFRASTRUCTURES

(71) Applicant: ArtinSoft Corporation, Bellevue, WA (US)

(72) Inventors: Carlos Araya, Cartago (CR); Iván Sanabria, Cartago (CR); Federico Zoufaly, San José (CR); Mauricio Rojas, Heredia (CR); Edgar Infante, Cartago (CR); Olman Garcia, San José (CR)

(73) Assignee: ArtinSoft Corporation, Bellevue, WA (US)

( * ) Notice: Subject to any disclaimer, the term of this patent is extended or adjusted under 35 U.S.C. 154(b) by 0 days.

(21) Appl. No.: 14/160,521

(22) Filed: Jan. 21, 2014

(65) Prior Publication Data

US 2014/0215446 A1 Jul. 31, 2014

Related U.S. Application Data

(63) Continuation-in-part of application No. 13/842,519, filed on Mar. 15, 2013.

(60) Provisional application No. 61/758,217, filed on Jan. 29, 2013.

(51) Int. Cl.
*G06F 9/45* (2006.01)
*G06F 9/44* (2006.01)

(52) U.S. Cl.
CPC ............... *G06F 8/76* (2013.01); *G06F 8/427* (2013.01); *G06F 8/447* (2013.01); *G06F 8/456* (2013.01)

(58) Field of Classification Search
None
See application file for complete search history.

(56) References Cited

U.S. PATENT DOCUMENTS

| | | |
|---|---|---|
| 5,812,851 A | 9/1998 | Levy et al. |
| 6,353,925 B1 | 3/2002 | Stata et al. |
| 6,542,908 B1 * | 4/2003 | Ims |
| 6,738,967 B1 * | 5/2004 | Radigan ............... G06F 8/47 |
| | | 717/146 |
| 6,862,559 B1 * | 3/2005 | Hogg .............................. 703/2 |
| 7,543,270 B1 | 6/2009 | Grace |
| 8,191,038 B1 | 5/2012 | Samuel et al. |
| 8,359,586 B1 | 1/2013 | Orofino et al. |
| 2001/0044811 A1 | 11/2001 | Ballantyne et al. |

(Continued)

OTHER PUBLICATIONS

Razavi et al.. "Partial evaluation of model transformations." Proceedings of the 34th International Conference on Software Engineering. IEEE Press, 2012.*

(Continued)

*Primary Examiner* — Chameli Das
*Assistant Examiner* — Joanne MacAsiano
(74) *Attorney, Agent, or Firm* — Han Santos Reich, PLLC (57) ABSTRACT

Techniques to automatically port applications to a mobile infrastructure using code separation with semantic guarantees are disclosed. Porting enterprise applications from to a target architecture another is effected via separating code into constituent layers of the target architecture. To preserve semantics, code transformations are enforced via an abstract syntax tree structure. The generated code may have various code wrappers and/or infrastructure elements so the ported application will operate in the target architecture. Various techniques are disclosed regarding specific code wrappers and/or infrastructure elements to address operating issues including, but not limited to, architectural issues, network latency, framework changes, regulatory issues.

26 Claims, 6 Drawing Sheets

(56) References Cited

U.S. PATENT DOCUMENTS

| | | |
|---|---|---|
| 2003/0083900 A1 | 5/2003 | Khriss et al. |
| 2003/0212698 A1 | 11/2003 | Mani et al. |
| 2004/0054946 A1 | 3/2004 | Atallah et al. |
| 2004/0068716 A1 | 4/2004 | Stevens |
| 2004/0225952 A1 | 11/2004 | Brown et al. |
| 2005/0108692 A1* | 5/2005 | Lau et al. ............... 717/136 |
| 2005/0177814 A1 | 8/2005 | Martlage |
| 2006/0100975 A1 | 5/2006 | McMaster et al. |
| 2006/0236307 A1 | 10/2006 | DeBruin et al. |
| 2007/0245330 A1 | 10/2007 | Lapounov et al. |
| 2007/0256058 A1 | 11/2007 | Marfatia et al. |
| 2007/0288751 A1* | 12/2007 | Rits ............... 713/168 |
| 2008/0222616 A1* | 9/2008 | Cheng ............ G06F 8/51 717/137 |
| 2008/0244517 A1 | 10/2008 | Rostoker |
| 2009/0064091 A1* | 3/2009 | Tonkin et al. ........... 717/104 |
| 2009/0119773 A1* | 5/2009 | D'Amore et al. ........ 726/21 |
| 2010/0074419 A1* | 3/2010 | Poremba ................ 379/45 |
| 2010/0269096 A1 | 10/2010 | Araya et al. |
| 2010/0287525 A1 | 11/2010 | Wagner |
| 2011/0055807 A1 | 3/2011 | Mahajan et al. |
| 2011/0154305 A1 | 6/2011 | LeRoux et al. |
| 2011/0179347 A1 | 7/2011 | Proctor et al. |
| 2011/0185354 A1* | 7/2011 | Tanner et al. ............ 717/178 |
| 2011/0296391 A1 | 12/2011 | Gass et al. |
| 2011/0314445 A1 | 12/2011 | Dutta et al. |
| 2011/0320588 A1* | 12/2011 | Raleigh .................. 709/224 |
| 2012/0185821 A1 | 7/2012 | Yaseen et al. |
| 2012/0192163 A1 | 7/2012 | Glendenning et al. |
| 2013/0073614 A1* | 3/2013 | Shine et al. ............. 709/203 |
| 2013/0125098 A1* | 5/2013 | Dhoolia et al. .......... 717/137 |
| 2013/0145346 A1* | 6/2013 | Liu et al. ................. 717/113 |
| 2013/0198720 A1* | 8/2013 | Maurice et al. .......... 717/122 |
| 2014/0317591 A1 | 10/2014 | Rosomoff |

OTHER PUBLICATIONS

Zou, Ying. "Quality driven software migration of procedural code to object-oriented design." Software Maintenance, 2005. ICSM'05. Proceedings of the 21st IEEE International Conference on. IEEE, 2005.*

U.S. Appl. No. 13/842,519—Non Final Office Action Mailed Jan. 14, 2015, 50 pages.

U.S. Appl. No. 13/842,519—Final Office Action Mailed Nov. 4, 2015, 60 pages.

U.S. Appl. No. 13/842,519—Notice of Allowance mailed Feb. 29, 2016, 14 pages.

U.S. Appl. No. 14/676,140—Non-Final Office Action mailed Feb. 2, 2016, 40 pages.

U.S. Appl. No. 14/686,766—Non-Final Office Action mailed Jan. 15, 2016, 40 pages.

* cited by examiner

AUTOMATED PORTING OF APPLICATION TO MOBILE INFRASTRUCTURES

RELATED APPLICATIONS

This patent application claims priority to provisional patent application 61/758,217, titled "Automated Porting of Applications Across Enterprise Infrastructures" filed Jan. 29, 2013, and non-provisional patent application Ser. No. 13/842,519, titled "Code Separation With Semantic Guarantees" filed Mar. 15, 2013, both of which are incorporated by reference in full herein.

BACKGROUND

Software applications, such as accounting, finance, and customer relations applications, may constitute a large, ongoing investment by an enterprise or other organization. For example, an enterprise information technology ("EIT") organization may invest in the initial requirements gathering and design of an application. Then EIT may invest in the software programming, development and testing of the application. Next enterprise data will have to be entered or ported into the application. Finally the application will be deployed, often constituting an expense of both hardware and/or training.

As the application is used and modified during its lifecycle, the application accrues modifications and bug fixes, as well as an accretion of business unit information technology ("BUIT") satellite applications. In this way, an ecosystem builds around the original software application. Eventually the application may become relied upon by the enterprise as the embodiment of the enterprise's policies. Thus, a software application not only represents a financial investment, but also an institutionalization of the enterprise's business procedures.

However, technology platforms evolve and business needs and policies evolve. An example of the former is where an initial investment in a two tier client server software architecture may give way to three tier enterprise data center based architectures which in turn evolve into web based applications and cloud based applications, each time causing applications to be ported to the newer software architectures. Another example of the former is where programming languages and frameworks become deprecated, such as where Microsoft Visual Basic.NET™ and the .NET application framework was not fully backwards compatible with Microsoft Visual Basic 6 and its Component Object Model based infrastructure, giving rise to applications being ported. An example of the latter is where the C Standard Library <string.h> library was later found to be susceptible to buffer overrun security attacks, causing applications to be moved to fixed buffer equivalents.

Typically, porting an application to a new software architecture, or platform causes a full rewrite. Since the rewrite is to a new architecture, or platform, or represents some other form of code refactoring, the port will not behave exactly in the same way as before. For example, a personal computer based client application may be ported to a mobile device. Accordingly, the functionality of the ported application on mobile device will differ at least according to the form factor change.

The functionality change causes risk that the semantics of the rewrite will not exactly conform to the behavior of the original application. If this were to happen, BUIT satellite applications and other software applications interfacing with the original application may break.

This state of affairs leaves EIT organizations on the horns of a dilemma. The extension of the lifecycle of their mission critical software applications may rely on a successful port to a new architecture or platform. But to do so, the EIT organization may have to risk a non-conforming port. In other words, the EIT organization cannot rely on semantics to be preserved during a port.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

Transformations, Code Separation and Semantic Guarantees Components, Software Architectures and Component Types This patent application discloses automated code transformations of software applications where the transformation includes separating the code into components corresponding to a target architecture while guaranteeing semantic equivalence. Specifically, modern software applications are generally organized into separate components. Components may be loosely or tightly coupled and may have high or low degrees of cohesion. Accordingly, components are not merely functional blocks of code, but also include an invocation interface where the interface guarantees specific semantic behavior. In object oriented programming, a component's invocation interface is sometimes referred to as a "contract" thereby emphasizing the guarantee of specific semantic behavior.

Components are not homogenous. Components typically take on specialized roles in interacting with other components. In this way, components may be organized into parts of a larger software machine. For example in object oriented programming, design patterns are component interaction patterns where a generic component type may be specialized according to a particular application. For instance, one design pattern is the strategy design pattern where an abstract class is replaced with a concrete class depending on the context of a situation. Thus concrete components may take on the type of an abstract class.

Design patterns typically apply only to a part of a software application. However, there are patterns, called software architectural patterns, that cover an entire software application. Example software architectural patterns are model-view-controller ("MVC"), model-view ("MV"), and model-view-viewmodel ("MVVM"). Software architecture design is often driven by a platform. Specifically, a platform is the set of hardware and/or software that hosts and executes the software. A platform generally comprises hardware, an operating system, standard libraries and/or a software application framework. In the case of a virtual execution environment, the platform may not necessarily specify physical hardware but virtual hardware and an execution environment or virtual machine. In this way a platform describes the support infrastructure for a software application. As a result, a platform may describe the hardware architecture and platform software corresponding for various portions of a software architecture. For example, a mobile device may correspond to a client and a cloud based service may correspond to a web service. Thus an architecture, software or hardware or both, may give rise to a generic classes of components, known as component types.

Functionally Equivalent (Semantics Preserving) Transformations, Automation, and Abstract Syntax Trees Porting a software application involves porting the software application's source code. Typically source code is written in one or more programming languages, each programming language having its own grammar Early applications were written in a single programming language, such as FORTRAN or COBOL. Present enterprise applications are often written in multiple programming languages, often in the same source code file. For example, an application may use a structural language like Microsoft Visual Basic for procedures, but structured query language ("SQL"), for database access. By way of another example, web clients typically use some combination of hypertext markup language ("HTML"), cascading style sheets ("CSS"), and JavaScript.

As a result, in addition to porting to a different architecture, porting source code may involve transforming code expressed in multiple input grammars that represent the programming languages of the source code of the application to be ported, into code expressed in multiple output grammars representing the programming languages of the source code of the application after being ported. Enterprise applications, especially those that have been in operation for a relatively long time, are generally complex, may be large, and may be a hodge-podge of different programming languages and approaches as varied as the programmers who maintained the application.

Due to its complexity, porting an enterprise application is therefore a candidate program for computer automation. Specifically, the goal of a successful port is not only to achieve the architectural change and the translation across grammars, but also to preserve the semantics of the application's business logic after the porting process. That is to say, any invocation of the business logic post port should have the same behavior as prior to the port.

The emphasis on preserving semantics has the effect of de-emphasizing syntax. An automated approach to a port across architectures cannot be a naïve syntactic translation of the original components to the exact same components except in a different programming language. One approach to automating the porting process involves receiving input grammars and output grammars, developing a composite grammar, representing the application in an abstract syntax tree that supports the composite grammar. The abstract syntax tree may be annotated with transformational rules that impact either a node in the abstract syntax tree, all nodes in a sub-tree of the abstract syntax tree, or the entire abstract syntax tree. In this way, porting can be effected by traversing the abstract syntax tree and using the transformational rules in the annotations to determine what output code to generate.

The Notion of Code Separation

However, after a port, the architectural changes and grammar changes will change some of the functionality of original application vis-à-vis the ported application. At the very least, the ability to run on a new architecture constitutes a functional change. With an architectural change, components in the original application may not have a one to one correspondence with components in the ported application. Thus during a port, a decision is made as to which semantics are to be preserved.

Code separation is the process of identifying which portions of the source code of the original application map to different portions of a target architecture. Correctly separating code is the basis for a successful port. Consider the case where an application's client application was originally targeted for a personal computer but is being ported to a mobile phone. The user interfaces of the client applications will differ due to the form factor change. However both client applications should be able to expect that interactions with the business logic will be the same as in the original application. Therefore, separating code for the client from code for the business logic provides a basis for determining which semantics to preserve during a port.

Code Separation and Different Transformations

Code separation will have a varying role in an application port depending on the transformation to be achieved. A transformation is a deterministic alteration of source code to achieve a desired result. Since a transformation is achieved by the application of a deterministic algorithm, typically the transformation may be reversed by applying the inverse of the algorithm. However, transformations are not necessarily commutative.

Some transformations will not involve code separation. For example, a pure language port that does not involve an architectural change is less likely to use code separation. Language based changes such as compilation, or insertion of artifacts such as debug information, tend to preserve architecture.

However, other transformations will rely on code separation. In particular, changes in hardware architecture, such as porting from a single core computer processing unit ("CPU") to a multi-core CPU, or to a system-on-a-chip ("SoC"), give rise to new hardware capabilities. Therefore the porting process will identify functionality in the original application that may take advantage of the new hardware. Similarly, porting software to a new framework, such as from COM to .NET, or to a new software architecture, such as a from two-tier client server to a web based services oriented architecture ("SOA") is likely to rely on code separation since the component types in the original application will not have a one to one correspondence to the components types of the targeted architecture. In general, the greater the difference in architecture of the original application to the targeted architecture, the greater the reliance on code separation.

Differences in component types are not necessarily based on architecture. Some transformations, such as performance optimizations and code refactoring are not re-architecting transformations. For example, components may be combined into a single dynamic link library ("DLL") to improve load times. Similarly, during refactoring, analysis may identify redundant code and consolidate functionality accordingly. Automated modifications to support a global business policy change in an application may also use code separation as some components likely to embody the policy may be assigned a distinct component type.

The Context of Code Separation with Semantic Guarantees

Figure 1:
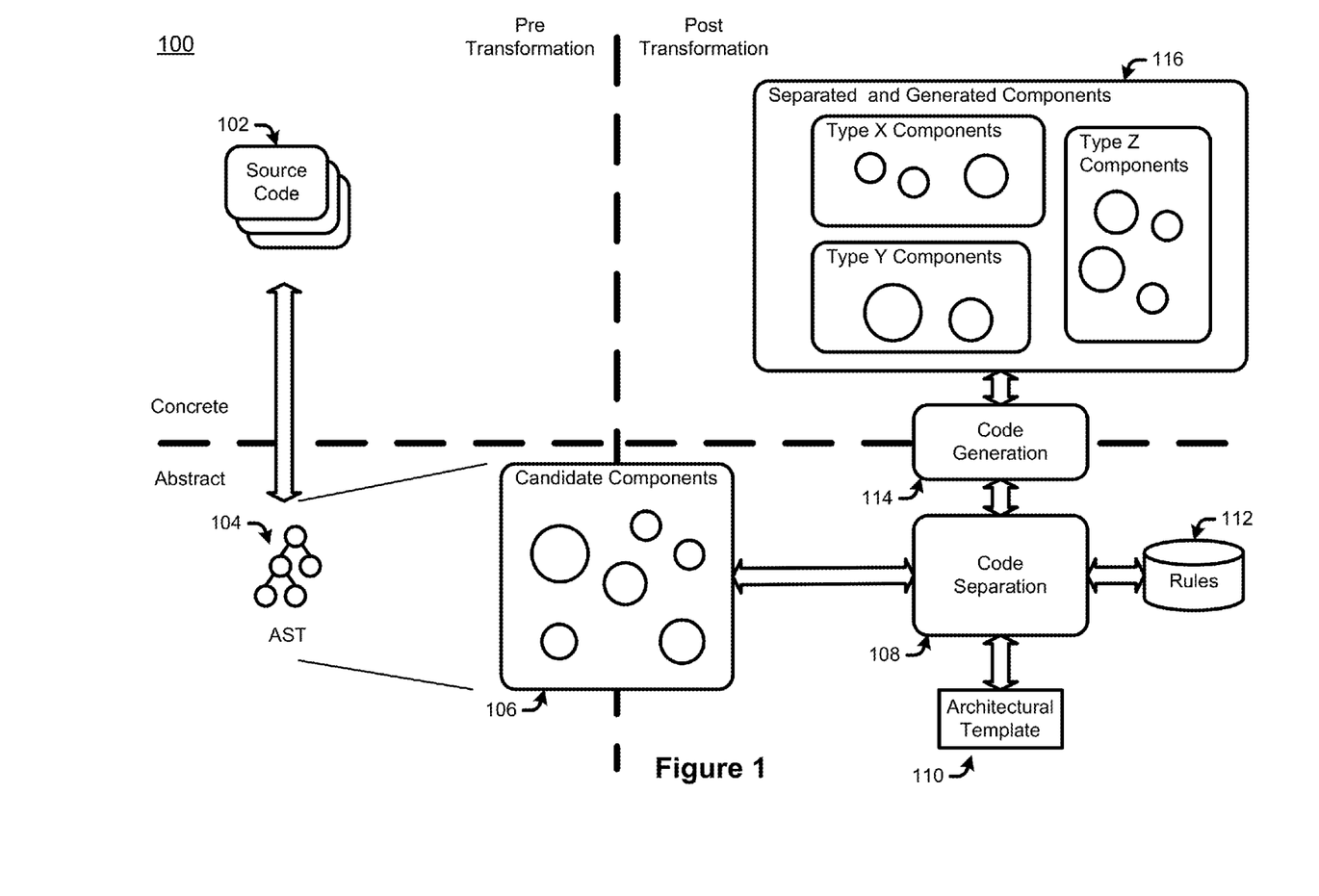
FIG. 1 is a top level context diagram for automated porting of applications.

Having introduced code separation, we turn now to the automation of code separation. FIG. 1 is an exemplary context diagram 100 for automated porting of applications with semantic guarantees. Specifically, an automated software application transformation may be considered in terms of moving from concrete terms to abstract terms, as represented by the horizontal dotted line, and in terms of moving from pre-transformation, i.e., the original application, to post-transformation, i.e., the ported application.

Source code 102 comprises a concrete representation of the original application. Source code 102 is typically in the form of source code files and is generally written in one or more programming languages, each programming language represented by a grammar.

The source code 102 may be statically analyzed, and represented in an annotated abstract syntax tree 104, which supports the input grammars of the programming languages in the original application, as well as the output grammars of the programming languages in the targeted architecture. The annotations in the abstract syntax 104 tree represent transformational rules that impact either a node in the abstract syntax tree 104, all nodes in a sub-tree of the abstract syntax tree 104, or the entire abstract syntax tree 104. Thus code generation may be effected by a traversal of the abstract syntax tree 104 while applying the transformational rules.

However, code generation will also include separating code into components. Code separation starts with identifying candidate components 106 by querying the abstract syntax tree 104. A code separation function 108 analyzes the candidate components 106 in view of an architectural template describing the target architecture 110, i.e., the architecture the original application is being ported to, and transformational rules 112. Note that the transformational rules 112 may be part of the abstract syntax tree 104 or may be stored separately. The code separation process is described in more detail with respect to FIG. 3.

Once the code separation function 108 has identified how code from the original application is to be mapped to components in the target architecture, a code generation function 114 may commence. During the code generation, in additional to translation to new languages the components of the target architecture may be wrapped with code to facilitate operation in the target architecture, and may be connected to additional infrastructure elements, such as a run-time to optimize execution.

Exemplary Hardware Platform

Figure 2:
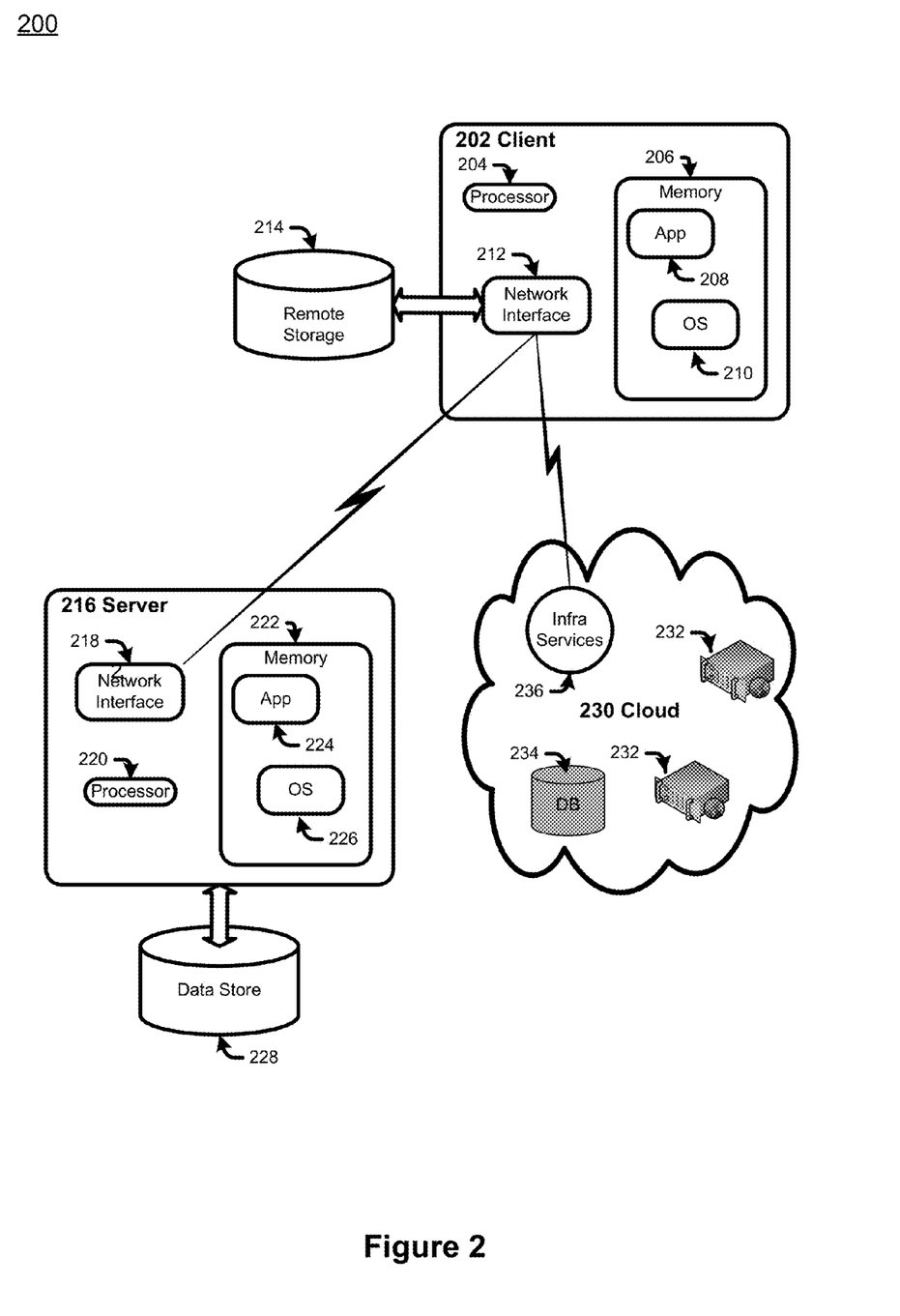
FIG. 2 is a hardware diagram of an exemplary hardware and software platform for automated porting of applications.

FIG. 2 illustrates one possible embodiment of a hardware environment 200 for automated porting of applications with semantic guarantees.

Client device 202 is any computing device. A client device 202 may have a processor 204 and a memory 206. Client device 202's memory 206 is any computer-readable media which may store several programs including an application 208 and/or an operating system 210.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, user equipment device 202 may have a network interface 212. The network interface 212 may be one or more network interfaces including Ethernet, Wi-Fi, or any number of other physical and data link standard interfaces. In the case where the programming language transformations are to be done on a single machine, the network interface 212 is optional.

Client 202 may use the network interface 212 to communicate to remote storage 214. Remote storage 214 may include network aware storage ("NAS") or may be removable storage such as a thumb drive or memory stick.

Client 202 may communicate to a server 216. Server 216 is any computing device that may participate in a network. Client network interface 212 may ultimate connect to server 216 via server network interface 218. Server network interface 218 may be one or more network interfaces as described with respect to client network interface 212.

Server 216 also has a processor 220 and memory 222. As per the preceding discussion regarding client device 202, memory 222 is any computer-readable media including both computer storage media and communication media.

In particular, memory 222 stores software which may include an application 224 and/or an operating system 226. Memory 218 may also store applications 224 that may include a database management system. Accordingly, server 216 may include data store 228. Data store 228 may be configured as a relational database, an object-oriented database, and/or a columnar database, or any configuration to support policy storage.

Server 216 need not be on site or operated by the client enterprise. Server 216 may be hosted in a cloud 230. Cloud 230 may represent a plurality of disaggregated servers which provide virtual web application server 232 functionality and virtual database 234 functionality. Cloud 230 services 232, 234 may be made accessible via cloud infrastructure 236. Cloud infrastructure 236 not only provides access to cloud services 232, 234 but also billing services. Cloud infrastructure 236 may provide additional service abstractions such as Platform as a Service ("PAAS"), Infrastructure as a Service ("IAAS"), and Software as a Service ("SAAS").

Figure 3:
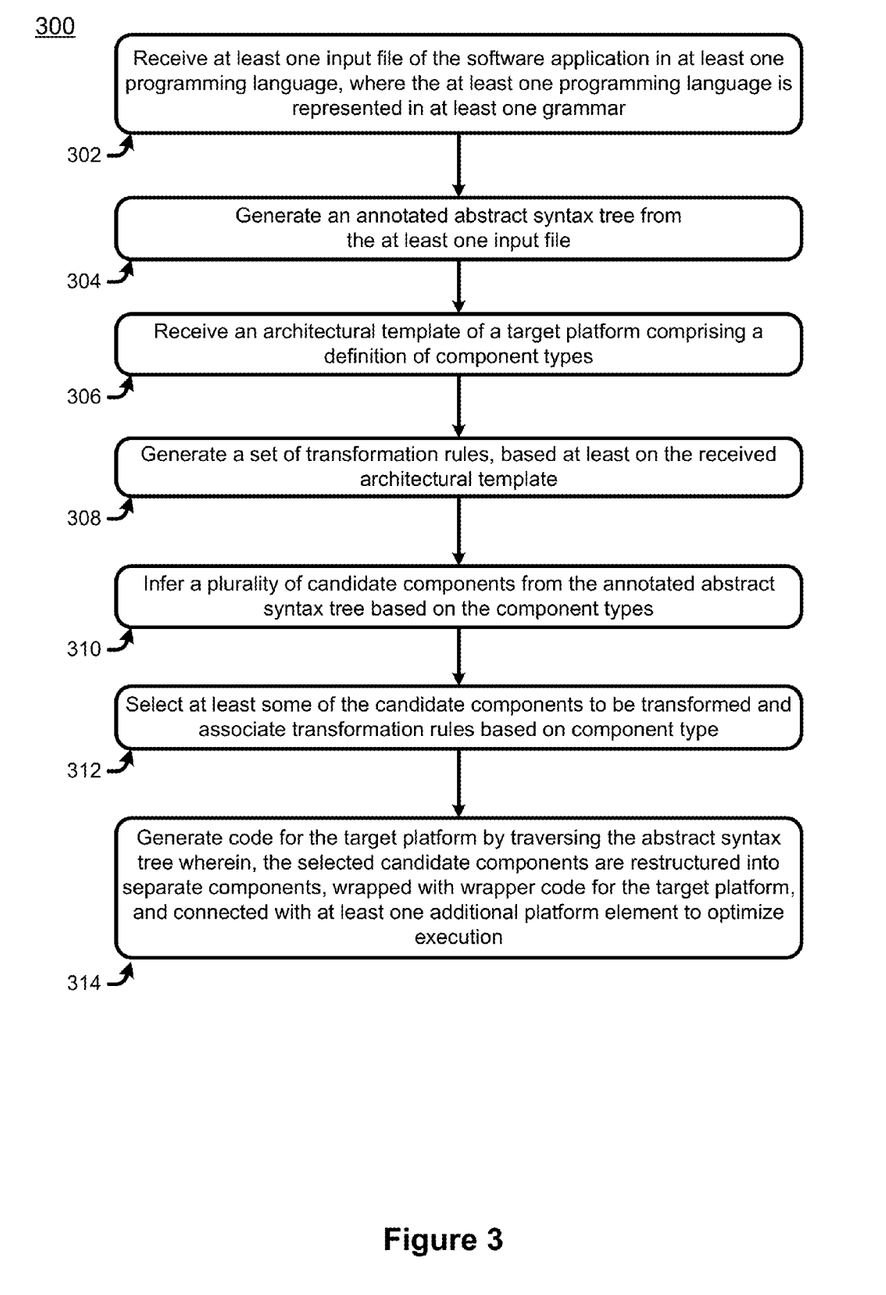
FIG. 3 is a flowchart of an exemplary operation of a software application transformation during automated porting of applications.

Example Operation of Performing a Software Application Transformation Using Automated Porting of Applications Software application ports are a form of software application transformation. Where the application architecture is to change, or where the application transformation gives rise to changes in component types, code separation techniques that preserve semantics are to be brought to bear. FIG. 3 illustrates a flowchart 300 of the example operation of performing a software application transformation using automated porting of applications with semantic guarantees.

In block 302, input comprising source code is received. Source code may be in the form of files written in one or more programming languages, each programming language represented in a grammar.

A code separation function may access the source code transformed into an abstract syntax tree that supports the input grammars of the source code of the original application as well as the output grammars of the target architecture, i.e., the architecture of the ported application. The abstract syntax tree may be annotated with transformational rules.

In block 304, an annotated abstract syntax tree is generated from at least one of the source code files of the original application. In this way, a port of a selected portion of the original application or a complete port of the entire original application may be effected.

In block 306, the code separation function receives an architectural template. The architectural template may describe a hardware architecture and/or a software architecture. The architectural template may describe solely the target software architecture, or may additionally describe a target platform comprising a target hardware architecture and support software such as an operating system, support libraries and/or frameworks, or an execution environment or virtual machine. In the case where the architectural template describes the target platform, the architectural template may also describe the advantages and disadvantages of the target platform. For example, where the target platform is distributed, the architectural template may indicate where performance may be degraded by network connections due to remote communications. By way of another example, the architectural template may indicate strong parallel processing capabilities, as in a server. In this way, the architectural template may provide input that may weigh the selection of components for a corresponding component type.

The architectural template will provide the basis for defining component types. For example, a software architecture may prescribe a client tier, a business logic tier, and a persistence tier. Each of these tier may represent a component type. Other software architectures include examples such as model-view-controller, model-view, and model-view-viewmodel. The specific example of model view viewmodel is discussed in more detail with respect to FIG. 5.

Alternatively, the architectural template may represent a business architecture instead, where each component type enumerates a function corresponding to the organization of the business enterprise such as departments and cost centers.

In the case of hardware architectures, the architectural template may describe a cloud infrastructure using a service oriented architecture accessed by mobile devices. The architectural template may include information about additional functionality present in the target cloud architecture such as that exposed by Platform as a Service, Infrastructure as a Service, and Software as a Service functionality.

In block 308, the existing transformational rules in the annotated abstract syntax tree are augmented with a generated set of transformational rules specific to the received architectural template. Example transformational rules would include the generation of wrapper code corresponding to the component types described in the architectural template. Wrapper code may include simple "plumbing" code that allows invocation in the new architecture. For example, components that were once local to each other may be transformed into remote components invoking each other via remote procedure call ("RPC"). Other transformation rules may include converting components from stateful to stateless components where they are to reside in a middle tier. In some cases, instead of wrapper code, a component may be transformed by invoking a platform element to optimize execution. Platform elements may include prebuilt platform rearchitecture agents containing code artifacts for the target platform. For example, the platform elements for a web page may include prebuilt hypertext markup language ("HTML"), cascading style sheet ("CSS") and JavaScript files.

Note that it may be desirable for an architectural template to describe different transformation options for the same component type. For example, in a mobile device client scenario, a technician may desire to support both Apple iOS™ and Google Android™ embodiments of a client. In this case, components that have a client component type will have two sets of transformation rules, a first set corresponding to transforming the client components into an Apple iOS™ mobile client, and a second set corresponding to transforming the client components into a Google Android™ mobile client.

Not all transformation rules are driven by the architectural template. For example, the transformations translating the source code to the programming languages of the target architecture need not be generated from the architectural template.

Once the transformation rules specific to the architectural template are generated, the code separation function determines which components to apply those transformation rules. In block 310, the annotated abstract syntax tree is queried for candidate components. Candidate components are functional blocks with an invocation interface whose semantic behavior is guaranteed. The candidate components are inferred to be of a component type in the architectural template. Inferring candidate components to be of a specific component type is described in more detail with respect to FIG. 4.

Once the candidate components are associated with component types, in block 312, at least some candidate components are selected for transformation. In some cases, all the candidate components are selected. However, in other cases, a technician may be reviewing the candidate components via an integrated development environment ("IDE") or some other development tool, and may opt to override the inferences made in block 310. Based on these selections, the abstract syntax tree may be further annotated with additional transformation rules, where these additional transformation rules are associated with the selected components. If the additional rules are added while a code generation is in progress, then the code generation may be reperformed via an IDE or development tool.

In general, an IDE or development tool provides the opportunity to monitor the status of a code generation in progress. For example, a log of operations against the abstract syntax tree, such as annotated, component identification, component type identification, and repositioning may be viewed. Particularly large and complex trees may take a relatively long time, thus the log may be viewed substantially in real time. Accordingly, an IDE or development tool may receive input from a technician to modify a code generation operation while in progress.

Where the IDE or development tool receives input from a technician, the components in the abstract syntax tree directly affected by the input are identified. Since the abstract syntax tree effectively stores information about components affected by other components changing, usually in the form as storing components in an affected component's subtree. Thus the IDE or development tool can identify all components dependent on components directly affected by a change. Thus if a code generation is in progress, code generation for the directly affected components as well as their dependent components may be reperformed. In this way, correct code may be generated despite an input change from a technician, without forcing a full code regeneration of the entire abstract syntax tree.

An IDE or development tool may access an arbitrary abstract syntax tree. Therefore, an IDE or development tool may manage transformations on different abstract syntax trees. Conversely, an abstract syntax tree may store a plurality of transformation rules for the same components in its annotations. For example, client components may be annotated with transformation rules to target a tablet or a personal computer at the same time, and the IDE or development tool will select which transformation rules to apply. In this way, an abstract syntax tree may be shared.

Upon selection, the application is ported by generating code in block 312. Specifically, the abstract syntax tree is traversed, and pretty printed according to the transformational rules. Code generation may include the generation of wrapper code as described above. Code generation may also include the generation of infrastructural elements to optimize execution. For example, it may be appropriate to generate a runtime, or a helper library specific to the target architecture.

Inferring Component Types During Code Separation

Figure 4:
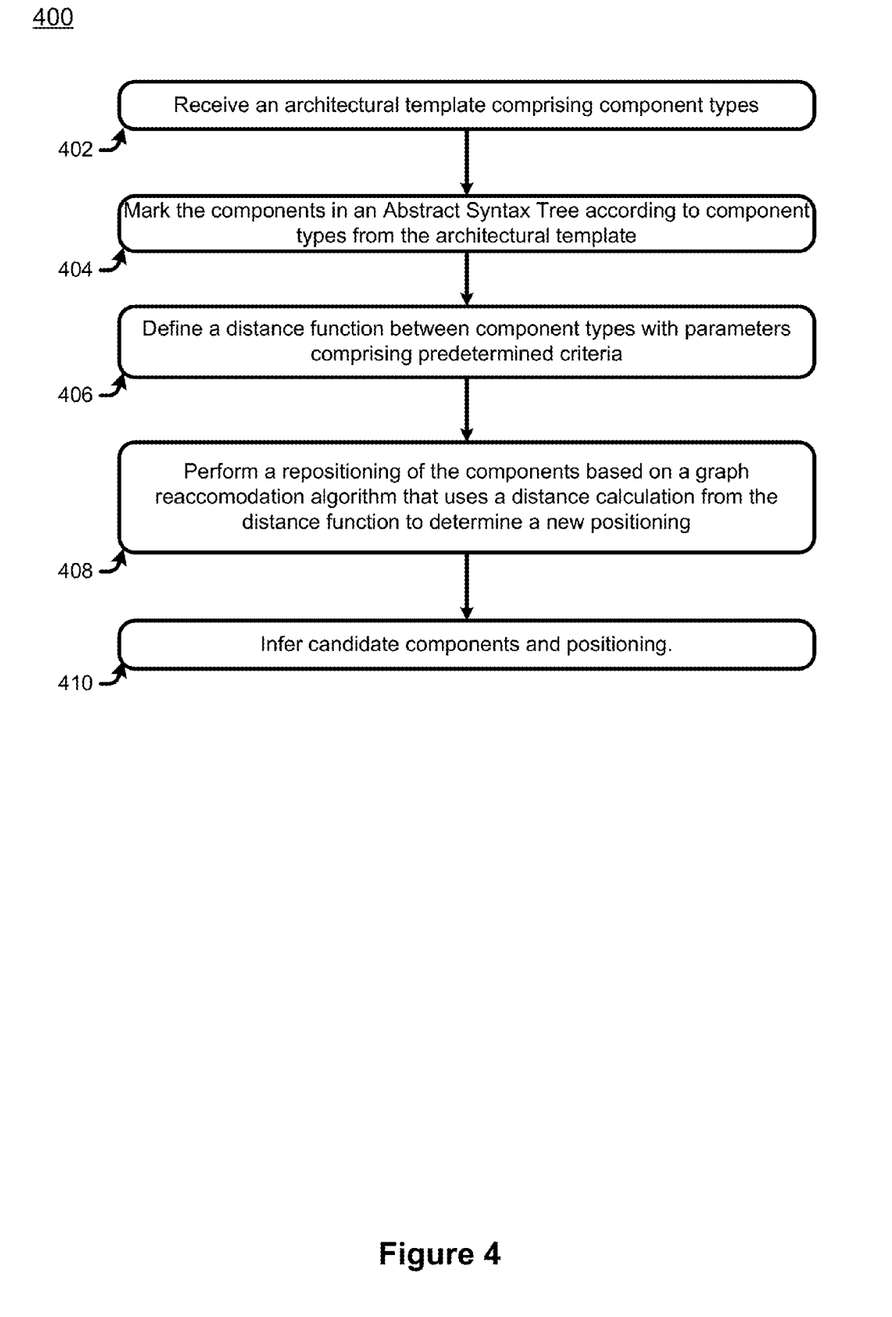
FIG. 4 is a flowchart of an exemplary operation of inferring components during code automated porting of applications.

During code separation the code separation function infers which candidate components belong to a component type of the architectural template. Automated inference may be performed in a number of ways, but generally involves determining how similar a component is to a component type. FIG. 4 illustrates a flowchart of an exemplary embodiment inferring a component type during automated porting of applications with semantic guarantees.

In block 402, the code separation function receives an architectural template comprising one or more component types as described with respect to FIG. 3 above.

Recall that at this point, there is an abstract syntax tree that supports input grammars of the programming languages of an original software application and output grammars of the programming languages of the target architecture. The abstract syntax tree also represents a parsing or static analysis of at least some of the source code the original software application. Accordingly, the abstract syntax tree contains components comprised of a functional source code block with an invocation interface that guarantees the semantic behavior of the functional source code block.

Thus in block 404, the code separation function marks the components in the abstract syntax tree as at least one of the component types of the architectural template. This results in an abstract syntax tree with a number of candidate components. It also results in a number of candidate components that are not necessarily organized by component type, and therefore may need repositioning.

To perform the repositioning, in block 406, a distance function for component types is defined in terms of parameters comprising predetermined criteria. A distance function for component types provides a similarity score for component to a component type. The distance function typically supports a metric, for example a Euclidean distance. In this way, the distance function provides a way to perform deterministic sorting where the components are ordered monotonically, based on similarity to a component type. This ordering is performed in block 408 by a graph reaccommodation algorithm that uses the distance function as a metric. Specifically, the graph reaccommodation algorithm repositions components based on similarity to a component type.

One consequence of the ability to perform ordered sorting by component type is that the code separation function can identify the outer boundaries of each component type. Therefore, the invocation interfaces on the outer boundaries may be configured to guarantee semantics, and the interior components that do not face components from other component types may potentially be refactored without changing semantics. For example, a middle tier object having a business object component type that faces client objects might not change its invocation interface, but a business objects that face other business objects might be merged or otherwise modified.

The distance function may be a function of one or more predetermined criteria which allow the distance to be weighted. Examples include, but are not limited to: component similarity, component affinity, and component performance based on component proximity. For component similarity, the distance measure may directly calculate how similar a component is to a component type. For component affinity, the distance measure may modify the calculation how similar a component is to a component type based on similarity to other components known to belong to that component type. For example, a radio button may be classified as a client component type if it is measured as similar to a standard button which was beforehand classified as a client component with high confidence. For component performance, the distance measure may be modified in terms of performance metrics. For example, a stateless business object that would ordinarily be grouped with other middle tier objects might be placed instead with client objects to limit network round trips. Thus even though the stateless business object is classified as a business object and likely would be placed in a middle tier, the distance measure may be weighted to place stateless business objects closer to the client component type.

The predetermined criteria may be have been received with an architectural template. For example an architectural template may have enumerated the advantages and disadvantages of a target platform. Based on those advantages and disadvantages, the distance function may be weighed to favor one component type over another, based on the characteristics of a component. The advantages and disadvantages may not be specific to component type, but may indicate a change in operation, such as in a service oriented architecture, specifying that some objects should be stateless objects to facilitate scalability. Alternatively, the predetermined criteria may be independent of architecture, and not necessarily have been received with an architectural template. For example, business policies and enterprise standards may be specified as the predetermined criteria for the distance function.

There are several examples of graph reaccommodation algorithms. One example is simulated annealing. Simulated annealing is a well known algorithm where a large graph of objects may be organized. In the present example, the components comprise nodes in the graph, and the distance function defines the strength of connections between the nodes of the graph. The distance function is used to define a value to be tested for extrema (e.g. in this case typically a minima) After establishing an initial positioning, and the extrema value, the simulated annealing function iterates through potential repositionings. Where a repositioning improves the extrema value (e.g. a lower value is discovered if testing for minima), the repositioning is replaces the prior positioning. When a predetermined threshold is satisfied, for example a time limit or a desired extrema threshold, the simulated annealing iteration stops. The components in the abstract syntax tree are then repositioned according to the final positioning determined by the simulated annealing algorithm.

Another example of a graph reaccommodation algorithm is to use develop a lattice comprising multiple dimensions, each dimension corresponding to a component type. Components are then placed in the lattice according to similarity to the component type. A force function describing affinity between the components is then described. A first repositioning is then effected by first applying the force function to determine the degree of repulsion between the components. A second repositioning is then effect by then applying the force function to determine the degree of attraction between the components. The result is a repositioning of the components where components of similar component type aggregate.

In general, the where the overall ordering of a system may be represented based on component distances based on the distance function, the system may be deterministically reordered such that the components aggregate to their likely component types. One may consider variations on linear programming where a tableau describing the graph of components may be pivoted to a desired extrema. Accordingly, this patent application describes various graph reaccommodation techniques without loss of generality.

Regardless of the graphic reaccommodation algorithm used, or the distance function used, once the candidate components are repositioned, in block 410 the code separation algorithm may infer which candidate components have which component types based on the repositioning. At this point, the repositioned abstract syntax tree is ready for code generation as described with respect to FIG. 3 above.

Example Use Cases

The aforementioned code separation techniques may be used for a number of transformations. By way of example, a typically application is to port a legacy client-server application to a web based service oriented architecture ("SOA").

In this example, the server portion of the client-server application is hosted on a web infrastructure such as a cloud infrastructure. The client application may continue to be accessible via a personal computer, but as a web application. Furthermore, the client application may also be ported to various tablet targets and/or mobile phone targets.

Figure 5:
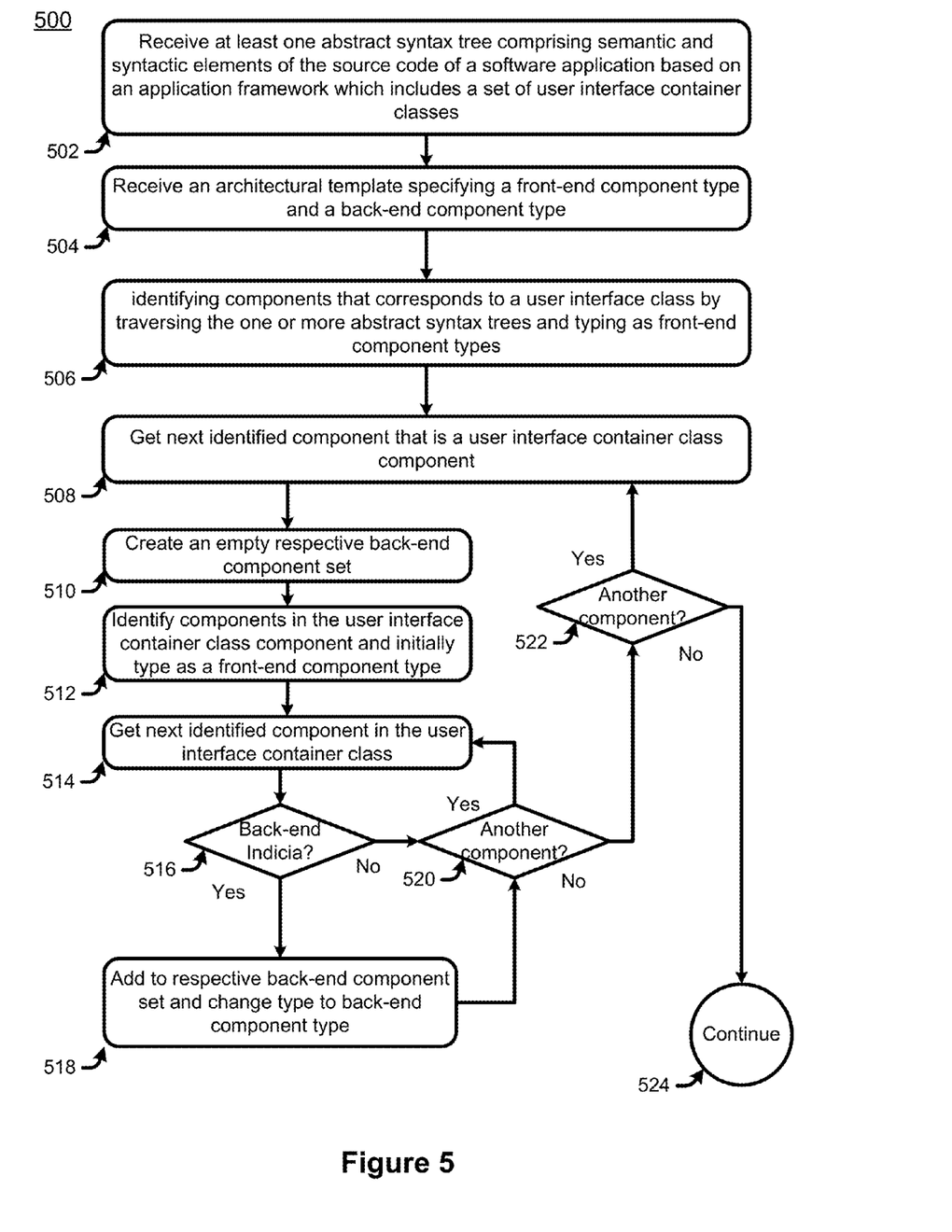
FIG. 5 is a flowchart of an exemplary operation of an MVVM re-architecture via automated porting of applications.

A typical software architecture is the model-view-viewmodel, which is used as the target architecture. Therefore, component types of model, view, and viewmodel are derived from the target architecture. Roughly speaking, the model may be the client side local data model, such as an extensible markup language ("XML") data island. The view may correspond to a client hypertext markup language ("HTML") and cascading style sheet ("CSS") client with embedded JavaScript that accesses the XML data island. Finally, the viewmodel may be a server side web service that serves the data island. FIG. 5 illustrates a flowchart of an exemplary embodiment of automated porting of applications with semantic guarantees in a port to a model-view-viewmodel target architecture.

As described with respect to FIG. 3 above, source code for a software application may be parsed or statically analyzed to generate one or more abstract syntax trees that capture the semantic and syntactic elements of the source code. In the present MVVM example, we assume the software application is written using an application framework that includes one or more user interface container classes. For example, .NET™ may include a Windows Form, and the Microsoft Foundation Classes™ include Dialog Box, Form, and Window and Document-View classes. In block 502, one or more abstract syntax trees for the software application are received.

In block 504, an architectural template specifying a front-end component type and a back-end component type is received. In the present example, the model-view portion of the target architecture corresponds to the front-end component type and the viewmodel portion of the target architecture corresponds to the back-end component type. Other mappings may exist. For example a view-controller portion of a model-view-controller architecture may correspond to the front-end component type and the model portion may correspond to the back-end component type. Thus while the present example is directed to MVVM architectures, other architectures with a front-end component type and a back-end component type are supported without loss of generality.

In block 506, the abstract syntax trees are traversed or otherwise queried for all instances of components that are a user interface container class in the application framework. Those components are then typed as front-end component types.

In block 508, the identified user interface container components are iterated. For each user interface container component, all components contained by the container class are grouped together. In block 510, a respective back-end component set is created. At this point, the back-end component set starts as an empty set.

In block 512, the components contained by the container class are iterated through. As each component is iterated in block 514, the code separation function seeks back-end indicia for the component in block 516. If back-end indicia are detected, then in block 518, the component is added to the respective back-end component set and the component type is changed to back-end component type. Otherwise, in block 520, the next component is retrieved. If the iteration is complete, then execution proceeds to block 522.

There are a number of back-end indicia. For example, the attributes of a component may be reviewed for references. If the references are made solely by business logic or persistence functions, then the component may be likely to be a back-end component. Framework class type may also assist. Many classes in an application framework are known to be either front-end or back-end types. Accordingly, the application framework type may be indicia of being a back-end component type (or not being a back-end component type). In other situations, a component may be compared to another component known to be a back-end component type. Where the similarity satisfies a predetermined threshold, the component may be determined to be a back-end component type.

The foregoing is not intended to be an exhaustive list of back-end indicia. Where an IDE or development tool is used in the code separation process, a technician may identify new heuristics or back-end indicia, and may modify the code separation process accordingly.

In block 522 the code separation function determines whether there is another user class component to iterate. If there is, then execution returns to block 508. Otherwise, execution continues to a next phase in block 524. At this point, after execution, the components are now typed either as front-end component types or as back end component types, completing the component type inference such as in block 310 of FIG. 3.

Classes of Mobile Use Cases

One use case of code separation is to port a legacy application to a mobile application. As described above, code separation takes source code for a legacy application and identifies candidate components that correspond to architectural classes. In the case of generating a mobile application, architectural classes at least include a mobile component to be hosted on a mobile computer and a server component to be hosted on an application server, perhaps implemented on a web server in a cloud.

Legacy enterprise applications often assumed relatively homogenous clients, specifically personal computers running the same operating system displaying large monitors with 4:3 aspect ratios. In contrast, mobile computers range from smart phones and tablets with different operating systems, different aspect ratios and different connectivity capabilities. For example, it is not unusual for different cellular carriers to sell different smartphones, with different operating systems, where the operating system is specific to the cellular carrier.

Porting a multi-tier enterprise application to the above mobile architecture includes accounting for architecture specific issues. Such issues may include the following classes of porting use cases, each typified by a mobile architecture being constrained, or less capable, than a desktop architecture.

Mobile architecture may be constrained by form factor. Mobile form factors, that is the size and hardware user interface of the hardware of the mobile client is generally smaller and more diverse than desktop platforms. A mobile application may have to simultaneously support different smart phones, different tablets, as well as personal computers. Accordingly, the supporting multiple form factors as well as smaller form factors constitutes a constraint.

Mobile applications may also be constrained by the latency of a distributed cellular network. Legacy enterprise applications often could rely on 100 Mbps Ethernet connections. In contrast, mobile computers may range from slow 2G connections to fast 4G LTE connections. In some cases mobile computers can perform WiFi offload if close to a WiFi access point. However, the reality is that network latency is an issue for a mobile application to manage.

Mobile clients may vary not only by hardware, but also by platform. A software platform generally includes an operating system and an application framework. A software platform, along with the form factor of the mobile device constitutes a framework specific architecture. A framework specific architecture may be constrained compared to a desktop. Alternatively the variations of a framework specific architecture may constitute a constraint.

Specifically, in many cases, the operating system may vary by cellular carrier, where different cellular carriers modify the operating system. Modifications to the operating system are often a result of self-optimizing network (SON) functionality distributed by cellular carriers as described below. The operating system may support have a software platform, such as a run time and a library, that constitute an application framework. Examples include the Java Virtual Machine™ and the .NET™ application framework. Mobile devices participate on the Internet. Accordingly, mobile devices may access third party web services. A common example includes using a social network such as Face-Book™ for authentication. This example is described in more detail below. These third party web services constitute an extension to the mobile device's platform. Targeting a specific framework, an extension to the platform, or alternatively a lowest common denominator of frameworks all constitute constraints.

Mobile devices have capabilities and regulations that constitute constraints on architecture. Specifically, those capabilities and/regulations may be addressed by wrapper code or potentially by added infrastructure elements.

Unlike desktop computers, mobile devices roam. Since different geographical regions have different networks, mobile applications may have to account for changing networks. Accordingly, the architecture may be constrained by geographic region. For example, a user roaming from a high coverage urban area to a low coverage rural area may have to account for dropped connectivity and may throttle network use to preserve quality of service.

Mobile devices that participate on a cellular network are constrained by cellular network regulations. Accordingly, additional infrastructure elements may have to be added to a ported mobile application. For example, Emergency 911 (E-911) regulations may block internet protocol calling applications where the user's address has not been set. A ported mobile application may have to have an address check added to the application. E-911 is described in more detail below.

Target hardware of mobile devices and its supporting operating system may also vary. For example, some smartphones include a stylus or other alternative hardware input devices. Other smartphone manufacturers add new user interface gestures or software input alternatives to the operating system. These new alternatives constitute an extension to the software framework and the hardware architecture.

For these use cases classes, as well as other mobile application specific issues, code generation includes the generation of wrapper code and infrastructure elements to mitigate these issues as described in the following paragraphs.

Form Factor Management

Form factor management includes code transformations specific to a mobile application itself, to a mobile application managing multiple form factors, and a mobile application managing different platforms from different cellular carriers.

In managing code transformations specific to a mobile application, the key issue is in fitting an application that originally targeted a 17" to 24" monitor, to a 4" to 5" smart phone screen. Merely scaling the application down results in user interface elements, such as buttons and text boxes and other controls, being too small to read or activate. Accordingly, the user interface typically has to be redesigned to move user interface elements around to fit on the screen of a mobile computer while maintaining accessibility.

Different classes of transformations include rearranging the location of user interface elements, eliminating selected user interface elements, and substituting user interface elements. An example rearranging transformation includes moving user interface elements closer together without reducing the size of the user interface elements. An example elimination transformation includes removing pictures and logos from the mobile version of an application. An example of substituting user interface elements may be to separate panes in a web page into separate web pages.

Typically, some combination of the three classes of transformation may be used. For example, a particular web application, may subdivide applications into divisions, each with their own set of user interface elements. Some divisions may be displayed in side by side columns. One technique to compress the space used by a user interface is to transform the divisions such that they occupy only one column sequentially. Thus two divisions once displayed side by side are transformed to display sequentially in a column. Alternatively, separate divisions might be simply moved to different screens within an application. Different screens may be easier to use if one of the divisions is particularly long.

In managing code transformations specific to a mobile application targeting multiple platforms, the key issue is that an application user interface may have different versions for a personal computer as opposed to a mobile computer. During code generation, either the user interface wrapper code or an infrastructure element could include code to identify whether the computer hosting the application was a personal computer as or a mobile computer. For example, a web site might include either a java script or VBScript snippet to identify the hosting computer form factor. If the form factor was a personal computer, the personal computer version of the application would run. If the form factor was mobile computer, the mobile computer version of the application could run. Scripts can also identify operating system version and the specific mobile computer. Accordingly, application versions specific to an operating system or a mobile computer could also be displayed according to a script.

Application versions may proliferate according to mobile computer. In an effort to differentiate platforms, mobile computer vendors often expose proprietary functionality. For example, Samsung Electronics™ supports a series of proximity gestures called Air Gestures™. In order for an application to take advantage of Air Gestures™ a script may be written to determine whether the mobile computer was a Samsung™ device supporting Air Gestures™. If so, the version of the application supporting proximity gestures would appear, or alternatively the corresponding feature in the application would be activated.

Mobile computers are regulated more than desktop personal computers. One set of regulations relates to Emergency 911 (E-911) where voice over IP and other WiFi calling is activated only if the calling infrastructure can identify the user's location. In this way, in event of a 911 emergency call, the dispatcher can automatically identify the location of the emergency. To support this, wrapper code and/or infrastructure elements may be generated to provide location autopopulation services whenever voice over IP or other WiFi calling infrastructure is invoked.

Mobile application specific code generation is not limited to the client side. Enterprise applications were often written before third party web services proliferated. Many third party web services, often in the social space such as FaceBook™ and Twitter™ presently expose application programming interfaces (APIs) that may be leveraged by applications. Accordingly, wrapper code and/or infrastructure elements may be generated to access those third party web services.

One special example of invoking third party web service APIs relates to security. FaceBook™ and other social web services may be delegated to for authentication. Instead of entering a proprietary user name and password, an application may use FaceBook™ authentication instead via APIs. While the FaceBook™ APIs may be secure, care must be taken to ensure that any user information used to invoke the API is secure. Accordingly any generated wrapping code and/or infrastructure elements may add functionality to ensure parameters are not transmitted in plaintext, but are otherwise encrypted.

Network Latency Management

As described above, enterprise applications often were written with the assumption of a relatively fast network connection. Mobile applications contend with many issues including inconsistent coverage, different connectivity technologies, roaming, data plan charges to name a few. A mobile application may be generated in such a way to account for network latency. Network connectivity optimizations may be generated either by adding functionality in the generated mobile application itself, or by allowing the generated mobile application to take advantage of network optimizations created by the cellular carrier. In either case, the generated mobile application may have a mobile component that contains client side network connectivity functionality, and a server component may that contains server side network connectivity functionality.

There are well known application optimizations, many of which are carryovers from client server architectures. Such optimizations include content caching, where commonly requested content is statically cached. In the case of server side optimization content need not be dynamically generated, thereby lowering response time. Furthermore, if content, such as images and other large binary objects are cached on the client side, network latency is reduced since the cached objects need not be re-requested.

Another application optimization is connection pooling. A server side network component may preallocate network connections. As a client finishes using a network connection, the connection is not deallocated. Rather it is returned to a connection pool so that another client may use it. In this way, the time to allocate the network connection is removed from network latency. Thus a mobile application may have a server side network component that implements a connection pool, and a client side network component that utilizes network connections from the pool.

Since mobile computers have relatively unreliable network connections, it is not unusual for a server to complete an operation, send a change request to a client, and for the client to no longer be connected. In the case of transactions, this can lead to inconsistent state, a violation of transactional properties. One solution is to implement so-called lazy transactions. Specifically, change requests are queued to the client. When the client reconnects, it executes the change request completing the transaction. Where a predetermined time threshold passes, the transaction may be rolled back. As with the previous features, a mobile application may have a server side network component, and a client side network component that implement lazy transactions.

The opposite of lazy transactions is to enforce synchronization of layers; instead of allowing layers to synchronize when network connectivity is available, we may enforce a synchronization event between layers almost immediately. This particularly is apropos for layers that reside in the cloud. For example, in a Model-View-ViewModel architecture, the ViewModel may reside in the cloud. Since a View component and a Model component of the ViewModel both are hosted in the cloud, where network connectivity is generally available, if the View component changes, we can instantaneously notify the Model component of the ViewModel to update, and vice versa.

Figure 6:
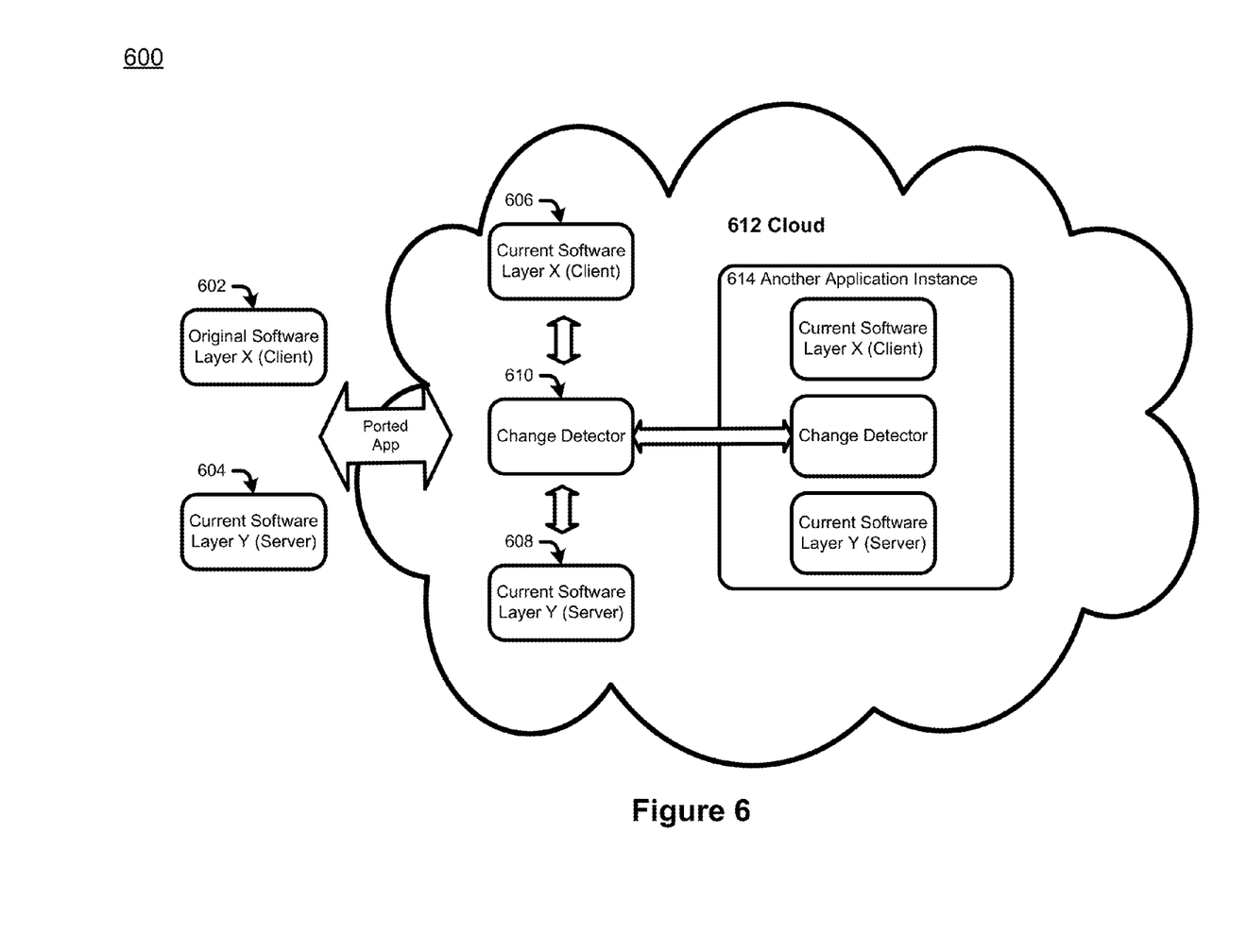
FIG. 6 is a top level diagram of an exemplary operation of enforced timing for enforced state synchronization for different application layers as a transformation during automated porting of applications.

Accordingly, another application optimization that might be applied as a transformation during application porting is adding infrastructure to enforce timing for synchronization between layers. FIG. 6 is an exemplary diagram 600 illustrating enforced timing for synchronization between layers during automated porting of applications. In FIG. 6, the layers are a client layer X 602 and a server layer Y 604. An example client layer X 602 may be a View component of a ViewModel layer and a Model component of a ViewModel layer. When the application is ported, it is ported to corresponding client layer X 606 and server layer Y 608. An additional infrastructure element, a change detector, 610 is interposed in the ported application. When client layer X 606 performs a state change, such as a data change, change detector 610 detects the change. This may be done by notifications or events where the change detector 610 subscribes to predetermined change events in client layer X 606 or server layer Y 608, and receives notifications when those change events occur. Change detector 610 will then trigger corresponding changes in server layer Y 608 or client layer X 606 as needed. These corresponding changes may be implemented as event handlers. In order to be interface with change detector 610, client layer X 606 and/or server layer Y 608 may have wrapper code and/or infrastructure elements added. Client layer X 606, server layer Y 608 and change detector 610 may all reside in the cloud 612.

Not all scenarios making use of enforced timing are MVVM ViewModels. In some porting scenarios, where a legacy enterprise application was implemented as a monolith, it may be convenient to implement global state as a singleton. Accordingly, the state of the singleton will be propagated to different instances or session of the ported application. In this case, a change detector 610 may propagate changes, not only to client layer X 606 and/or server layer Y 608, but also to application instances 614. In this way, if a state change in a first application instance is to be propagated to a second application instance, a change detector in the first application instance may propagate changes to its counterpart change detector in the second application instance via transport through the cloud. With this mechanism, an instance with a singleton storing global state may propagate changes.

The largest savings in network latency overhead may be realized by generating a mobile application to take advantage of cellular carrier optimizations. The two most common optimizations are heterogenous network (HetNet) and self-optimizing networks (SON).

Heterogenous networks are networks that comprise both a cellular network and a WiFi network. Since smartphones typically support both cellular and WiFi, it a smartphone application may be configured to offload high bandwidth data transfers to WiFi (called WiFi offload), and to prohibit high bandwidth data transfers unless a WiFi connection is present. In this way, QoS may be increased. In a mobile environment, many users find WiFi offload to be a key strategy in lowering data plan charges. In fact, a mobile application may be optimized to minimize data plan charges as opposed to optimizing QoS.

Cellular networks also implement self-optimizing networks (SON). In a self-optimizing network, data is collected from the client application, the mobile computer, the base station/access network and the core network. Based on the data, routing and data throttling are implemented to optimize QoS. Accordingly, in some infrastructures it is desirable for a generated mobile application to provide the data specifically collected by a self-optimizing network. This data is generally automatically collected by the mobile operating system. However, where documented, additional data can be provided to the self-optimizing network. In one example, an application can request the routing priorities, such as PDP priorities, to vary in the core network. For example, video may be given a lower priority from audio, in a video call, until a slide presentation is displayed.

In both cases, wrapper code and/or infrastructure elements may be generated to take advantage of HetNet and/or SON. In many cases, since the mobile operating system handles HetNet and/or SON, the application may simply be deployed with a configuration file that enables Het/Net and/or SON optimizations respectively.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving one or more input source code files of an n-tier input application, the input source code files comprising a plurality of programming code constructs in one or more input grammars of a source programming language;
receiving one or more target grammars of an output application that constrain a target architecture of the output application;
receiving an architectural specification corresponding to the n-tier input application;
receiving a target architectural specification corresponding to the target architecture of the output application;
generating an annotated abstract syntax tree representing at least one programming code construct in the one or more input grammars of the source programming language from at least one input source code file, the annotated abstract syntax tree being generated based at least on one or more target grammars of a target programming language, the architectural specification of the n-tier input application, and the target architecture specification, wherein at least one annotation of the annotated abstract syntax tree comprises a transformation rule to map the programming code construct in the one or more input grammars of the source programming language from the at least one input source code file represented in the annotated abstract syntax tree to the target architecture of the output application; and
generating target source code for the output application based at least on the annotated abstract syntax tree, the target source code being semantically equivalent to input source code in the one or more input source code files while comprising at least one mobile component and at least one server component.

2. The method of claim 1, wherein the target architecture includes one of the following:
a mobile form factor constrained target architecture,
a distributed network constrained architecture,
a framework specific architecture,
a geographic region constrained architecture,
an architecture constrained by regulatory provisions, and
an extension to a framework specific architecture.

3. The method of claim 1, wherein the generating target source code comprises:
separating a plurality of components included in the programming code constructs and represented in the abstract syntax tree from the one or more input source code files, wherein the plurality of components comprise candidate components for one of a plurality of component classes;
selecting from the plurality of components at least one component belonging to a client class and at least one additional component belonging to a server class;
adding wrapping code to one or more selected components; and
adding at least one infrastructure element, wherein the at least one infrastructure element provides functionality not provided by the programming code constructs from the one or more input source code files.

4. The method of claim 3, wherein the separating is based at least on iteratively measuring distances of a candidate component to component class types of the target architecture and repositioning the candidate component into the client class or the server class based on the distances of the candidate component to the component class types using a re-accommodation algorithm.

5. The method of claim 3, wherein the separating is based at least on profiling an input source code compiled from the input source files according to predetermined use cases.

6. The method of claim 1, wherein the input source code files correspond to a plurality of projects.

7. The method of claim 1, wherein the target architecture is a mobile form factor constrained target architecture, and wherein the transformation rule is any one of: rearranging locations of user interface elements, eliminating selected user interface elements, and substituting the selected user interface elements with other user interface elements.

8. The method of claim 1, wherein the target architecture is a mobile form factor constrained target architecture, and wherein the transformation rule is to add infrastructure element code identifying whether a hosting computer for the at least one mobile component is a desktop computer or a mobile computer, further comprising presenting a desktop computer version of the at least one mobile component in an instance in which the hosting computer is a desktop computer and presenting a mobile computer version of the at least one mobile component in another instance in which the hosting computer is a mobile computer.

9. The method of claim 8, wherein the generating target source code includes generating wrapper code for the at least one mobile component such that the at least one mobile component invokes an API corresponding to a feature specific to a third party extension of a platform.

10. The method of claim 1, wherein the target architecture is a mobile form factor constrained target architecture, and wherein the received target architectural specification includes features specific to any one of the following: a mobile computer of the target architecture, an operating system version of the mobile computer, a cellular carrier of the target architecture, and an intended regional area of operation of the target architecture.

11. The method of claim 1, wherein the generating target source code includes generating wrapper code for at least one client component or at least one server component to invoke an API specific to a third party web service.

12. The method of claim 11, wherein the third party web service is an authentication service, and the wrapper code ensures that authentication information to the authentication service is in a form other than plaintext.

13. The method of claim 11, wherein the target architecture is an architecture constrained by regulatory provisions, and wherein a feature specific to a the mobile phone factor that is in the target source code is an invocation of a voice over of IP API, and the wrapper code ensures that identification information is registered to enable E-911 compliance.

14. The method of claim 1, wherein the received architectural specification corresponds to a first mobile form-factor constrained target architecture, further comprising receiving an additional second architectural specification that corresponds to a second mobile form-factor constrained target architecture, wherein the generating the target source code comprises generating the target source code to correspond to the first mobile form-factor constrained target architecture, and generating the target source code to correspond to a second mobile form-factor constrained target architecture.

15. The method of claim 1, wherein the target architecture is a distributed network constrained architecture, and wherein the transformation rule is any one of the following: enforced timing for client and server state synchronization, generated content caching, connection pooling, and lazy transactions.

16. The method of claim 1, wherein the target architecture is a distributed network constrained architecture, and wherein the target source code includes an added infrastructure element with functionality to detect a presence of a cellular network and a presence of a WiFi network, and load balance between the cellular network and the WiFi network.

17. The method of claim 16, wherein the load balance is optimized to minimize data plan charges.

18. The method of claim 1, wherein the target architecture is a mobile network constrained architecture, and wherein the received target architectural specification includes features specific to the mobile network constrained architecture's mobile computer, operating system variation, and cellular carrier.

19. The method of claim 18, wherein the at least one mobile component includes an added infrastructure element with functionality to report self-optimizing network specific performance parameters to a cellular network of the cellular carrier, and to perform client side network adjustments as directed by the cellular network of the cellular carrier.

20. The method of claim 19, wherein the at least one server component includes an added infrastructure element with functionality to vary PDP priority of constituent served data according to input parameters from a mobile component.

21. A system to perform a software application transformation comprising:
a processor;
memory storing a plurality of components that are executable by the processor, comprising:
a software user interface to specify source code files of a software application containing source code that are in one or more input grammars of a source programming language, to specify one or more target grammars of a target programming language, an input architecture of the software application, and a target mobile architecture for the software application with at least one architectural constraint;
a transformation rules generator, to generate transformation rules based at least on the specified input architecture of the software application and the specified target architecture of an output application, wherein the specified target architecture comprises at least one component type;
an abstract syntax tree generator, to generate an annotated abstract syntax tree based on the source code having the one or more input grammars of the source programming language as contained in at least one specified source code file, at least one specified target grammar of a target programming language, and at least one generated transformation rule that is generated based at least on the specified input architecture of the software application and the specified target architecture of the output application;
a component recommendation engine, to identify candidate components according to the at least one component type; and
an abstract syntax tree transformer, to generate at least one mobile component and at least one server component from one or more of the candidate components such that at least one transformation addresses the at least one architectural constraint.

22. The system of claim 21, wherein the one or more specified grammars includes at least one of the following: Pre-HTML 5 HTML; HTML 5; javascript; ecmascript; vbscript; java programming language; pre .NET Visual Basic TM; a .NET programming language; Objective C; PHP; Perl; Python; C; C++; and SQL.

23. The system of claim 21, wherein the target mobile architecture includes a cloud based server.

24. The system of claim 21, wherein the at least one architectural constraint specifies any one of the following: a mobile form factor constrained target architecture, a distributed network constrained architecture, a framework specific architecture, a geographic region constrained architecture, an architecture constrained by regulatory provisions, and an extension to a framework specific architecture.

25. A system to perform a software application transformation comprising:

a processor;

a memory storing a plurality of components that are executable by the processor, comprising:

a software user interface to specify source code files of a software application containing source code that are in one or more input grammars of a source programming language, one or more target grammars of a target programming language, an input architecture of the software application, and a target architecture of an output application with at least one architectural constraint, and to request an input of a user defined constraint;

a transformation rules generator to generate transformation rules based at least on the specified input architecture and the specified target architecture, wherein the specified target architecture comprises at least one component type;

an abstract syntax tree generator to generate an annotated abstract syntax tree based on the source code having the one or more input grammars of the source programming language as contained in at least one specified source code file, at least one specified target grammar of the target programming language, and at least one generated transformation rule that is generated based at least on the specified input architecture of the software application and the specified target architecture of the output application;

a component recommendation engine to identify candidate components according to the at least one component type; and an abstract syntax tree transformer to generate at least one mobile component and at least one server component from one or more of the candidate components based on the annotated abstract syntax tree such that at least one transformation applies the user defined.

26. The system of claim 25, wherein the target architecture is any one of the following: a mobile form factor constrained target architecture, a distributed network constrained architecture, a framework specific architecture, a geographic region constrained architecture, an architecture constrained by regulatory provisions, and an extension to a framework specific architecture.

* * * * *